(12) United States Patent
Izumi (10) Patent No.: US 11,554,448 B2
(45) Date of Patent: Jan. 17, 2023

(54) MACHINING CONDITION ADJUSTMENT APPARATUS AND MACHINE LEARNING DEVICE

(71) Applicant: FANUC Corporation, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 917 days.

(21) Appl. No.: 16/412,728

(22) Filed: May 15, 2019

(65) Prior Publication Data
US 2019/0351512 A1 Nov. 21, 2019

(30) Foreign Application Priority Data

May 15, 2018 (JP) .............................. JP2018-094133

(51) Int. Cl.
| | |
|---|---|
| *B23K 31/10* | (2006.01) |
| *B23K 26/00* | (2014.01) |
| *B23K 26/03* | (2006.01) |
| *B23K 26/082* | (2014.01) |
| *G05B 13/02* | (2006.01) |

(Continued)

(52) U.S. Cl.
CPC .......... *B23K 31/10* (2013.01); *B23K 26/0006* (2013.01); *B23K 26/034* (2013.01);
(Continued)

(58) Field of Classification Search
CPC .. B23K 31/10; B23K 26/0006; B23K 26/034; B23K 26/082; B23K 26/1464;
(Continued)

(56) References Cited

U.S. PATENT DOCUMENTS 5,506,386 A * 4/1996 Gross ..................... B23K 26/04
219/137 R
5,854,751 A 12/1998 Di Pietro et al.
(Continued)

FOREIGN PATENT DOCUMENTS

| CN | 107181163 A | 9/2017 |
|---|---|---|
| CN | 107953144 A | 4/2018 |

(Continued)

*Primary Examiner* — Rocio Del Mar Perez-Velez
*Assistant Examiner* — Christopher W Carter
(74) *Attorney, Agent, or Firm* — Hauptman Ham, LLP (57) ABSTRACT

Disclosed is a machine learning device of a cutting condition adjustment apparatus including: a state observation section that observes, as state variables indicating a current state of an environment, cutting condition data indicating a laser cutting condition for a laser cutting and oblique rearward temperature rise data indicating a temperature rise value at an oblique rearward part of a cutting front of a workpiece, a determination data acquisition unit that acquires temperature rise value determination data for determining propriety of the temperature rise value during cutting based on the laser cutting condition for the laser cutting as determination data indicating a propriety determination result of the cutting of the workpiece, and a learning unit that learns the temperature rise value and adjustment of the laser cutting condition for the laser cutting in association with each other using the state variables and the determination data.

14 Claims, 7 Drawing Sheets

(51) Int. Cl.
  *B23K 26/38* (2014.01)
  *B23K 26/70* (2014.01)
  *B23K 31/00* (2006.01)
  *B23K 26/14* (2014.01)

(52) U.S. Cl.
  CPC ........ *B23K 26/082* (2015.10); *B23K 26/1464* (2013.01); *B23K 26/38* (2013.01); *B23K 26/707* (2015.10); *B23K 31/006* (2013.01); *G05B 13/021* (2013.01); *G05B 13/027* (2013.01)

(58) Field of Classification Search
  CPC .... B23K 26/38; B23K 26/707; B23K 31/006; B23K 26/0869; B23K 26/705; G05B 13/021; G05B 13/027
  See application file for complete search history.

(56) References Cited

U.S. PATENT DOCUMENTS

| | | |
|---|---|---|
| 2006/0060571 A1 | 3/2006 | Mori et al. |
| 2007/0150079 A1 | 6/2007 | Blevins et al. |
| 2008/0105094 A1 | 5/2008 | McMurtry et al. |
| 2008/0296270 A1 | 12/2008 | Song et al. |
| 2010/0118913 A1* | 5/2010 | Courtois ............. G01K 7/42 374/102 |
| 2010/0288734 A1 | 11/2010 | Dave et al. |
| 2017/0032281 A1 | 2/2017 | Hsu |
| 2017/0220927 A1 | 8/2017 | Takigawa et al. |
| 2017/0262772 A1 | 9/2017 | Takigawa et al. |
| 2017/0270434 A1 | 9/2017 | Takigawa et al. |
| 2018/0107947 A1 | 4/2018 | Ogawa |
| 2018/0122623 A1 | 5/2018 | Hada |

FOREIGN PATENT DOCUMENTS

| | | |
|---|---|---|
| JP | H5309484 A | 11/1993 |
| JP | H7-100674 A | 4/1995 |
| JP | H9179623 A | 7/1997 |
| JP | 200744719 A | 2/2007 |
| JP | 2013244505 A | 12/2013 |
| JP | 2015206263 A | 11/2015 |
| JP | 2017131937 A | 8/2017 |
| JP | 2017-164801 A | 9/2017 |
| JP | 6289713 B1 | 3/2018 |

* cited by examiner

MACHINING CONDITION ADJUSTMENT APPARATUS AND MACHINE LEARNING DEVICE

RELATED APPLICATIONS

The present application claims priority to Japanese Patent Application Number 2018-094133 filed May 15, 2018, the disclosure of which is hereby incorporated by reference herein in its entirety.

BACKGROUND OF THE INVENTION

1. Field of the Invention

The present invention relates to a machining condition adjustment apparatus and a machine learning device.

2. Description of the Related Art

In a laser machine that performs cutting such as cutting of a workpiece with laser light, degradation of a constituent, attachment of a stain, or the like occurs for each operation. Therefore, the laser machine does not keep its steady state at all times. That is, the state of the laser machine changes day by day. For this reason, an optimum laser cutting condition for laser cutting may vary with a change in the state of the laser machine.

In the laser machine, it is desirable to set a laser cutting condition under which cutting accuracy or cutting quality is kept at a certain level and high-speed cutting is allowed. As a conventional technology for determining such a cutting condition for laser cutting, Japanese Patent Application Laid-open No. H07-100674 and Japanese Patent Application Laid-open No. 2017-164801 disclose technologies in which a laser cutting condition is adjusted on the basis of a temperature at a cut part of a workpiece during the operation of a laser machine.

However, the temperature at the cut part finely changes due to a kerf width, a pressure loss or an outflow of assist gas, or the like during the laser cutting. Therefore, when the temperature at the cut part is used in the adjustment of the laser cutting condition, there is a likelihood that the adjustment fails since the cutting condition becomes unstable. In addition, when the laser cutting is continuously performed on a single workpiece for a long period of time, the temperature of the workpiece rises with an increase in an amount of heat accumulated in the workpiece. In this case, it is not possible to accurately grasp an amount of heat transferred from laser irradiated to the cut part during the cutting. Therefore, even if the laser cutting condition is adjusted on the basis of the detected temperature at the cut part, the adjusted condition may not be optimum in some cases.

In view of the above state, the present invention has an object to provide a cutting condition adjustment apparatus and a machine learning device capable of appropriately adjusting a laser cutting condition during the laser cutting of a workpiece by a laser machine.

SUMMARY OF THE INVENTION

Figure 9:
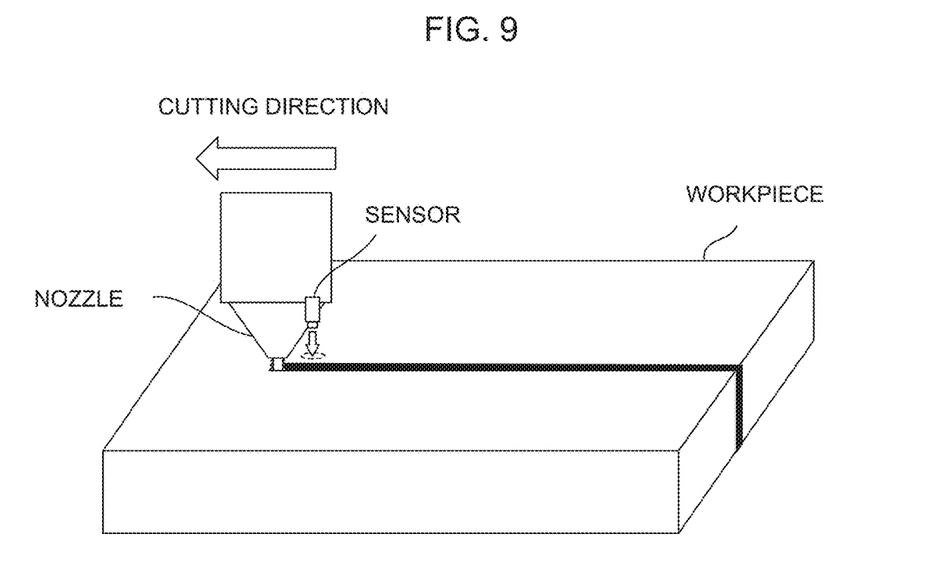
FIG. 9 is a diagram for describing a method for acquiring a temperature rise value as determination data according to an embodiment.

In a cutting condition adjustment apparatus according to an embodiment of the present invention, a laser cutting condition is adjusted on the basis of a temperature rise value per predetermined period at an oblique rearward part with respect to a cutting direction when seen from the cutting front of a workpiece that is being cut by laser cutting as shown in FIG. 9. The oblique rearward part of the cutting front of the workpiece corresponds to a position near a part at which the cutting has been completed. Compared with a cut part, a temperature at the oblique rearward part is stable since the oblique rearward part is less susceptible to noise. Therefore, the temperature at the oblique rearward part is suitable for grasping a state of the cutting. In addition, since the temperature rise value per predetermined period is used, it is possible to accurately grasp an amount of heat transferred to the workpiece by the laser cutting even when an environment temperature changes or the temperature of the workpiece itself rises. The temperature rise value per predetermined period more accurately reflects a state of the cut part than a detected temperature does. The laser cutting is appropriately performed by the adjustment of the laser cutting condition based on the temperature rise value per predetermined period.

According to an aspect of the present invention, there is provided a cutting condition adjustment apparatus that adjusts a laser cutting condition of a laser machine that performs laser cutting on a workpiece. The cutting condition adjustment apparatus includes a machine learning device that learns the laser cutting condition for the laser cutting. The machine learning device has a state observation unit that observes, as state variables indicating a current state of an environment, cutting condition data indicating the laser cutting condition for the laser cutting and oblique rearward temperature rise data indicating a temperature rise value at an oblique rearward part of a cutting front of the workpiece, a determination data acquisition unit that acquires temperature rise value determination data for determining propriety of the temperature rise value at the oblique rearward part of the cutting front of the workpiece during cutting based on the laser cutting condition for the laser cutting as determination data indicating a propriety determination result of the cutting of the workpiece, and a learning unit that learns the temperature rise value at the oblique rearward part of the cutting front of the workpiece and adjustment of the laser cutting condition for the laser cutting in association with each other using the state variables and the determination data.

According to another aspect of the present invention, there is provided a cutting condition adjustment apparatus that adjusts a laser cutting condition of a laser machine that performs laser cutting on a workpiece. The cutting condition adjustment apparatus includes a machine learning device that has learned the laser cutting condition for the laser cutting. The machine learning device has a state observation unit that observes, as state variables indicating a current state of an environment, cutting condition data indicating the laser cutting condition for the laser cutting and oblique rearward temperature rise data indicating a temperature rise value at an oblique rearward part of a cutting front of the workpiece, a learning unit that has learned the temperature rise value at the oblique rearward part of the cutting front of the workpiece and adjustment of the laser cutting condition for the laser cutting in association with each other, and a decision-making unit that makes a decision to perform the adjustment of the laser cutting condition for the laser cutting on the basis of the state variables observed by the state observation unit and a learning result of the learning unit.

According to another aspect of the present invention, there is provided a machine learning device that learns a laser cutting condition of a laser machine that performs laser cutting on a workpiece. The machine learning device includes: a state observation unit that observes, as state variables indicating a current state of an environment, cutting condition data indicating the laser cutting condition for the laser cutting and oblique rearward temperature rise data indicating a temperature rise value at an oblique rearward part of a cutting front of the workpiece; a determination data acquisition unit that acquires temperature rise value determination data for determining propriety of the temperature rise value at the oblique rearward part of the cutting front of the workpiece during cutting based on the laser cutting condition for the laser cutting as determination data indicating a propriety determination result of the cutting of the workpiece; and a learning unit that learns the temperature rise value at the oblique rearward part of the cutting front of the workpiece and adjustment of the laser cutting condition for the laser cutting in association with each other using the state variables and the determination data.

According to another aspect of the present invention, there is provided a machine learning device that has learned a laser cutting condition of a laser machine that performs laser cutting on a workpiece. The machine learning device includes: a state observation unit that observes, as state variables indicating a current state of an environment, cutting condition data indicating the laser cutting condition for the laser cutting and oblique rearward temperature rise data indicating a temperature rise value at an oblique rearward part of the cutting front of the workpiece; a learning unit that has learned the temperature rise value at the oblique rearward part of the cutting front of the workpiece and adjustment of the laser cutting condition for the laser cutting in association with each other; and a decision-making unit that makes a decision to perform the adjustment of the laser cutting condition for the laser cutting on the basis of the state variables observed by the state observation unit and a learning result of the learning unit.

According to an embodiment of the present invention, a laser machine appropriately adjusts a laser cutting condition during the laser cutting of a workpiece.

BRIEF DESCRIPTION OF THE DRAWINGS

The above and other objects and features of the present invention will become apparent from, the descriptions of the following embodiments with reference to the accompanying drawings in which.

DETAILED DESCRIPTION OF THE PREFERRED EMBODIMENTS

Hereinafter, embodiments of the present invention will be described with reference to the drawings.

Figure 1:
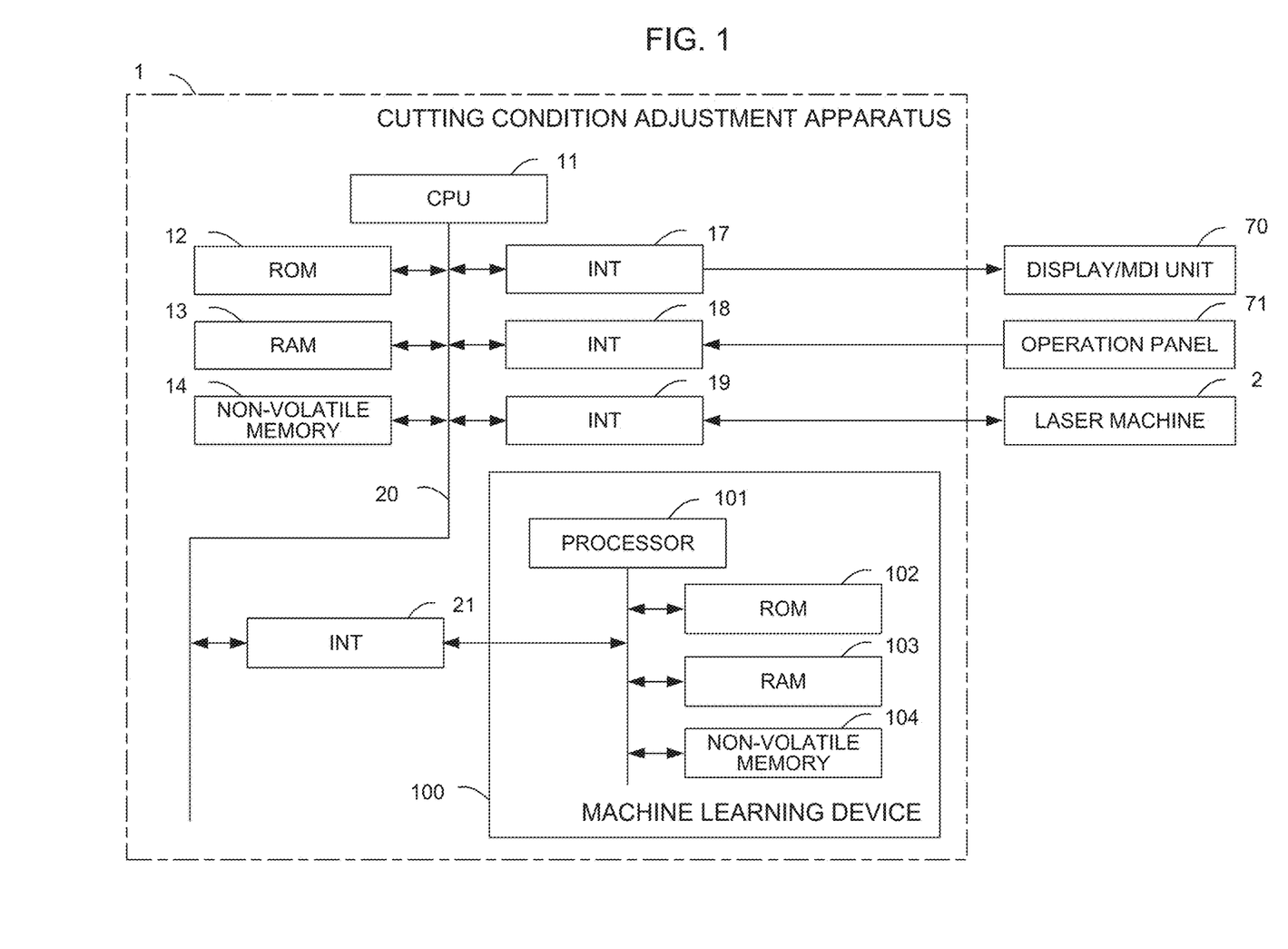
FIG. 1 is a schematic hardware configuration diagram of a cutting condition adjustment apparatus according to an embodiment.

FIG. 1 is a schematic hardware configuration diagram showing a cutting condition adjustment apparatus according to a first embodiment. The cutting condition adjustment apparatus 1 is mounted in, for example, a control apparatus that controls a laser machine 2. In addition, the cutting condition adjustment apparatus 1 may be mounted in, for example, a personal computer installed next to a control apparatus that controls a laser machine, a cell computer connected to a control apparatus via a wired/wireless network, a host computer, or a computer such as an edge server and a cloud server. The present embodiment will show an example in which the cutting condition adjustment apparatus 1 is mounted in a control apparatus that controls a laser machine 2.

A central processing unit (CPU) 11 of the cutting condition adjustment apparatus 1 according to the present embodiment is a processor that entirely controls the cutting condition adjustment apparatus 1. The CPU 11 reads a system program stored in a read-only memory (ROM) 12 via a bus 20. The CPU 11 entirely controls the cutting condition adjustment apparatus 1 according to the system program. A random-access memory (RAM) 13 temporarily stores temporary calculation data or display data, various data input by an operator via an input unit not shown, or the like.

A non-volatile memory 14 is backed up by, for example, a battery not shown. The non-volatile memory 14 is configured as a memory that maintains its storage state even if the power of the cutting condition adjustment apparatus 1 is turned off. The non-volatile memory 14 stores a program read from an external device (not shown) via an interface, a program, input via a display/manual data input (MDI) unit 70, and various data (such as a laser output, frequency, duty, cutting speed, a type or pressure of assist gas, a nozzle diameter, a gap, a focal position in laser cutting by the laser machine 2, and a temperature at the oblique rearward part of the cutting front of a workpiece detected by a sensor or the like attached to the laser machine 2) acquired from the respective units of the cutting condition adjustment apparatus 1 or the laser machine 2 via an interface 19. The program or the various data stored in the non-volatile memory 14 may be loaded into the RAM 13 in execution or in use. In addition, the ROM 12 stores in advance various system programs such as known analysis programs (including a system, program for controlling communication with a machine learning device 100 that will be described later).

The display/MDI unit 70 is a manual data input unit including a display, a keyboard, or the like. An interface 17 transfers command and data received from the keyboard of the display/MDI unit 70 to the CPU 11. An interface 18 is connected to an operation panel 71 including a manual pulse generator used to manually drive respective axes or the like.

An interface 21 is an interface for connecting a bus 20 connected to the respective units of the cutting condition adjustment apparatus 1 and the machine learning device 100 to each other. The machine learning device 100 includes a processor 101 that controls the entire machine learning device 100, a ROM 102 that, stores a system program or the like, a RAM 103 that temporarily stores various data used in respective cutting associated with machine learning, and a non-volatile memory 104 used to store a learning model or the like. The machine learning device 100 may observe respective information (such as a laser output, frequency, duty, cutting speed, a type or pressure of assist gas, a nozzle diameter, a gap, a focal position in laser cutting by the laser machine 2, and a temperature at the oblique rearward part of the cutting front of a workpiece detected by a sensor or the like attached to the laser machine 2) capable of being acquired, by the cutting condition adjustment apparatus 1 via the interface 21. In addition, the cutting condition adjustment apparatus 1 controls the operation of the laser machine 2 on the basis of a command for changing a cutting condition output from the machine learning device 100.

Figure 2:
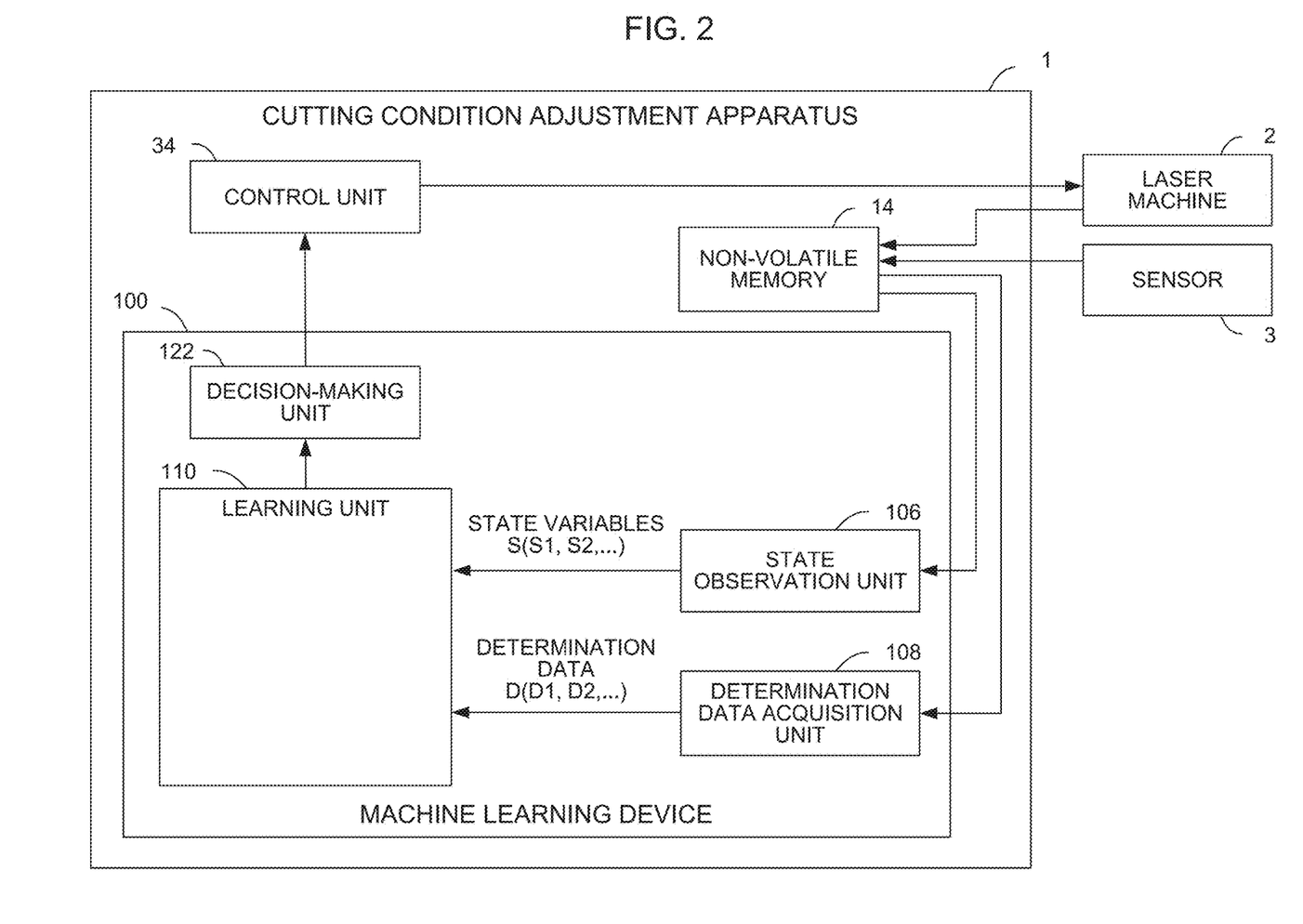
FIG. 2 is a schematic function block diagram of the cutting condition adjustment apparatus according to the embodiment.

FIG. 2 is a schematic function block diagram of the cutting condition adjustment apparatus 1 according to an embodiment. The functions of respective function blocks shown in FIG. 2 are realized when the CPU 11 of the cutting condition adjustment apparatus 1 and the processor 101 of the machine learning device 100 shown in FIG. 1 perform their system programs and control the operations of the respective units of the cutting condition adjustment apparatus 1 and the machine learning device 100.

The cutting condition adjustment apparatus 1 according to the present embodiment includes a control unit 34 that controls the laser machine 2 on the basis of a command for changing a cutting condition output from the machine learning device 100. The control unit 34 generally controls the operation of the laser machine 2 according to a command by a control program or the like. Further, when receiving a command for changing a cutting condition from the machine learning device 100 while controlling the operation of the laser machine 2, the control unit 34 controls the laser machine 2 such that laser cutting is performed under a cutting condition output from the machine learning device 100 instead of a control program or a laser cutting condition set in advance in the laser machine 2.

On the other hand, the machine learning device 100 includes software (such as a learning algorithm) and hardware (such as the processor 101) for spontaneously learning the adjustment of a laser cutting condition with respect to a temperature rise value at the oblique rearward part of the cutting front of a workpiece. The machine learning device 100 learns a model structure indicating the correlation between a temperature rise value at the oblique rearward part of the cutting front of a workpiece and the adjustment of a laser cutting condition for laser cutting.

As shown in the function blocks of FIG. 2, the machine learning device 100 includes a state observation unit 106, a determination data acquisition unit 108, and a learning unit 110. The state observation unit 106 observes, as state variables S indicating the current state of an environment, laser cutting condition data S1 indicating a laser cutting condition and oblique rearward part temperature rise data S2 indicating a temperature rise value at the oblique rearward part of the cutting front of a workpiece. The determination data acquisition unit 108 acquires determination data D including temperature rise value determination data D1 for determining the propriety of a temperature rise value at the oblique rearward part of the cutting front of a workpiece when laser cutting is performed on the basis of an adjusted laser cutting condition. The learning unit 110 learns the correlation between a temperature rise value at the oblique rearward part of the cutting front of a workpiece and the adjustment of a laser cutting condition using the state variables S and the determination data D.

Among the state variables S observed by the state observation unit 106, the laser cutting condition data S1 is a laser cutting condition for laser cutting performed by the laser machine 2. The laser cutting condition includes, for example, a laser output, frequency, duty, cutting speed, a type or pressure of assist gas, a nozzle diameter, a gap, and a focal position in laser cutting by the laser machine 2. Particularly, the focal position and the cutting speed have a large impact on the finish of a workpiece in laser cutting. Therefore, at least the focal position and the cutting speed are desirably included in the laser cutting condition data S1. The laser cutting condition is set in a program for controlling the operation of the laser machine 2 or the cutting condition adjustment apparatus 1. The machine learning device 100 acquires the set laser cutting condition from laser cutting parameters stored in the non-volatile memory 14 or the like.

As the laser cutting condition data S1, the machine learning device 100 uses a laser cutting condition adjusted with respect to a temperature rise value at the oblique rearward part of the cutting front of a workpiece in a previous learning cycle on the basis of a learning result of the learning unit 110. In this case, the machine learning device 100 temporarily stores in advance the laser cutting condition in the RAM 103 for each learning cycle. The state observation unit 106 acquires from the RAM 103 the laser cutting condition in the previous learning cycle as the laser cutting condition data S1 in this learning cycle.

The oblique rearward part temperature rise data S2 is acquired as a temperature rise value within a predetermined period of a temperature at the oblique rearward part of the cutting front of a workpiece detected by a sensor 3.

Figure 3:
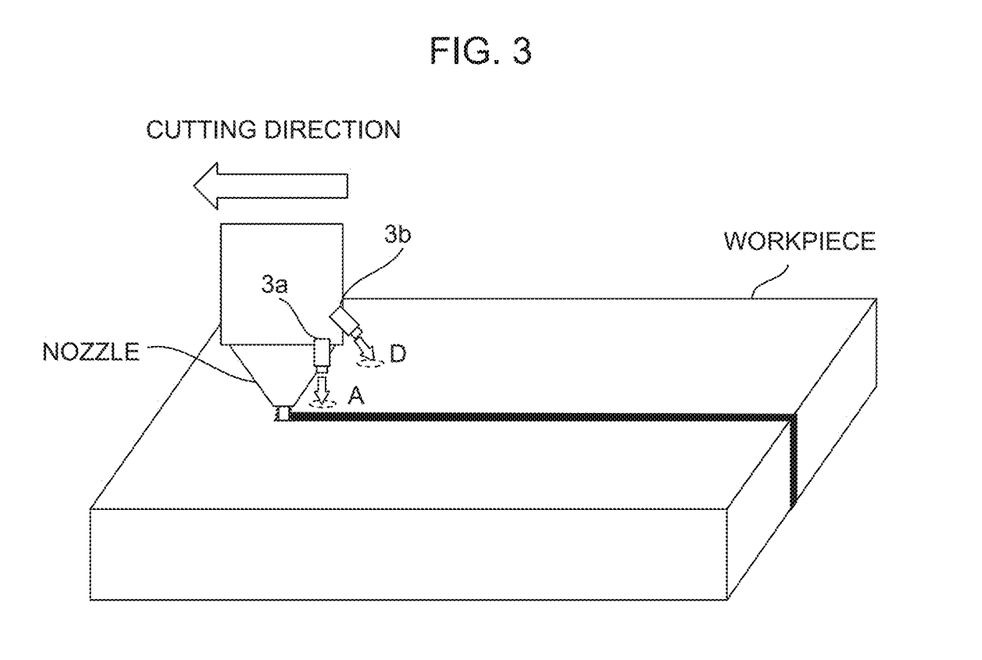
FIG. 3 is a diagram showing an example of a method for measuring a temperature rise value of a workpiece.

FIG. 3 snows a sensor 3a that measures a temperature TA at an oblique rearward part A of the cutting front of a workpiece and a sensor 3b that measures a temperature TD at a position D substantially distant from the cutting position of the workpiece. The oblique rearward part temperature rise data S2 is defined as, for example, a temperature rise value per predetermined period of a difference in the temperature (TA−TD) between the temperature TA measured by the sensor 3a and the temperature TD measured by the sensor 3b. The distance between the position A at which the temperature is stably measured by the sensor 3a in a state in which noise is reduced to a certain extent and the cutting front of the workpiece may be calculated in advance by experiment or the like. In the case of a laser machine of normal size, the position A is nearly about 5 mm to 10 mm away from, the cutting front of the workpiece. Further, the position D at which the temperature is measured by the sensor 3b is different depending on the material, thickness, or the like of the workpiece. Therefore, a position of the workpiece having a temperature close to a temperature of the workpiece before being subjected to cutting may only be calculated as the position D in advance by experiment or the like. The position of the workpiece having a temperature close to the temperature of the workpiece before being subjected to the cutting is the position of the workpiece at which the temperature does not change at all or at which the temperature does not greatly change during the laser cutting.

Figure 4:
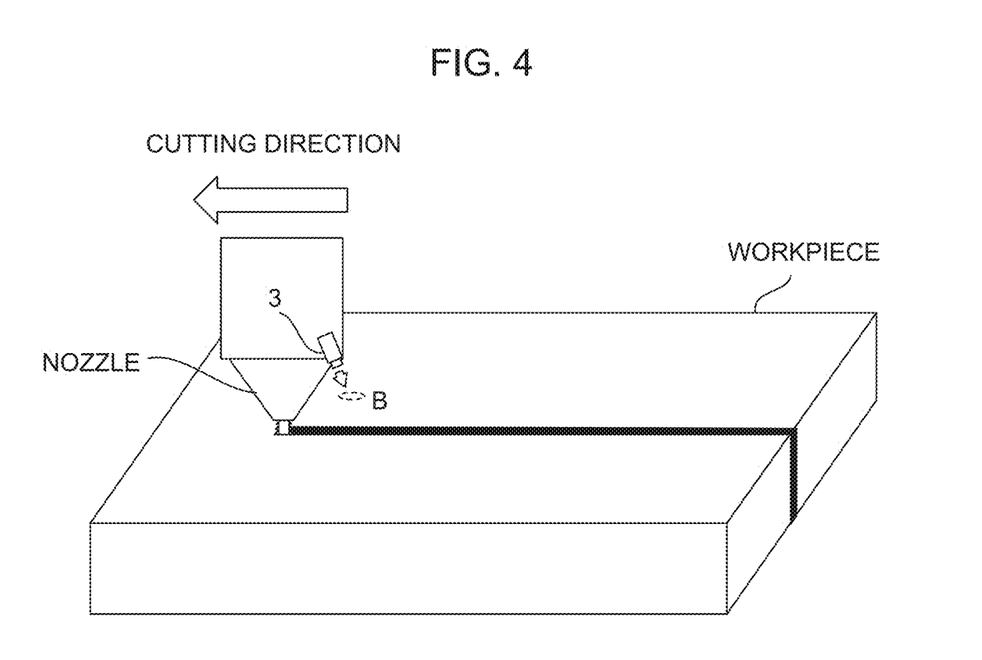
FIG. 4 is a diagram showing another example of a method for measuring a temperature rise value of a workpiece.

FIG. 4 shows a sensor 3 that measures a temperature TB at an oblique rearward part B slightly distant from the cutting front of a workpiece. The oblique rearward part temperature rise data S2 may be defined as, for example, a difference in the temperature (TB−TBb) between the temperature TB measured by the sensor 3 and a current reference temperature TBb of the workpiece estimated on the basis of a temperature TB0 of the workpiece measured at the start of cutting and information acquired during the cutting. The reference temperature TBb may be estimated using, for example, a temperature rise value of the workpiece during the cutting calculated by experiment or the like in association with a cutting condition, a workpiece material, heat capacity, or the like. Further, the reference temperature TBb may be estimated by a simulation or the like on the basis of an amount of heat given to the workpiece under a set cutting condition. Since a temperature rise value calculated by this method is an estimated value, accuracy in estimating the temperature rise value is lower compared with an example described with reference to FIG. 3. However, this method is superior in cost since only the one sensor 3 is attached to a nozzle.

When the learning unit 110 performs learning on-line, the state observation unit 106 may sequentially acquire respective state variables from the laser machine 2, the sensor 3, and the respective units of the cutting condition adjustment apparatus 1. On the other hand, when the learning unit 110 performs learning off-line, the cutting condition adjustment apparatus 1 may cause respective information acquired during the cutting of a workpiece and a cutting quality detection operation to be stored in the non-volatile memory 14 as log data such that the state observation unit 106 analyzes the recorded log data to acquire respective state variables.

The determination data acquisition unit 108 may use, as the temperature rise value determination data D1, a determination result of the propriety of a temperature rise value at the oblique rearward part of the cutting front of a workpiece when laser cutting is performed on the basis of an adjusted laser cutting condition. As the temperature rise value determination data D1, the determination data acquisition unit 108 uses, for example, information indicating whether a temperature rise value within a predetermined period of a temperature at the oblique rearward part of the cutting front of a workpiece is smaller (appropriate) or larger (inappropriate) than a predetermined threshold. It is assumed that the temperature rise value at the oblique rearward part of the cutting front of the workpiece has an appropriate value according to a type, size, or the like of the workpiece, but preferably has a smaller value in principle. The determination data acquisition unit 108 may have a plurality of thresholds to determine the propriety of the temperature rise value determination data D1 in stages. Further, the determination data acquisition unit 108 may make a determination using information indicating whether a temperature rise value acquired in this learning cycle is smaller (appropriate) or larger (inappropriate) than a temperature rise value at the oblique rearward part of the cutting front of a workpiece acquired in a previous learning cycle.

Note that the determination data acquisition unit 108 is an essential configuration when the learning unit 110 performs learning. However, the determination data acquisition unit 108 is not necessarily an essential configuration as the machine learning device 100 after the learning unit 110 has completed learning in which a temperature rise value at the oblique rearward part of the cutting front of a workpiece and the adjustment of a laser cutting condition are associated, with each other. For example, the machine learning device 100 that has completed the learning may be shipped to a customer with the determination data acquisition unit 108 removed therefrom.

In terms of the learning cycle of the learning unit 110, the state variables S input to the learning unit 110 simultaneously with the determination data D are those based on data in a learning cycle previous to a learning cycle at which the determination data D has been acquired. As described above, while the machine learning device 100 of the cutting condition adjustment apparatus 1 advances learning, the acquisition of the oblique rearward part temperature rise data S2, the cutting of a workpiece based on the laser cutting condition data S1 adjusted on the basis of acquired respective data, and the acquisition of the determination data D are repeatedly performed in an environment.

The learning unit 110 learns the adjustment of an optimum laser cutting condition with respect to a temperature rise value at the oblique rearward part of the cutting front of a workpiece according to any learning algorithm collectively called machine learning. That is, when the oblique rearward part of the cutting front of the workpiece shows a certain temperature rise value, the learning unit 110 learns the adjustment of a laser cutting condition to perform the optimum laser cutting. The learning unit 110 repeatedly performs the learning based on a data set including the state variables S and the determination data D described above. When the cycle of learning the laser cutting condition with respect to the temperature rise value at the oblique rearward part of the cutting front of the workpiece is repeatedly performed, the state variables S are acquired from, the temperature rise value at the oblique rearward part of the cutting front of the workpiece and a laser cutting condition for laser cutting adjusted in a previous learning cycle as described above. In addition, the determination data D corresponds to a propriety determination result of the cutting of the workpiece performed on the basis of the adjusted laser cutting condition for the laser cutting.

By repeatedly performing such a learning cycle, the learning unit 110 is allowed to identify a feature suggesting the correlation between a temperature rise value at the oblique rearward part of the cutting front of a workpiece and the adjustment of a laser cutting condition for laser cutting. The correlation between the temperature rise value at the oblique rearward part of the cutting front of the workpiece and the adjustment of the laser cutting condition for the laser cutting is substantially unknown at the start of a learning algorithm. The learning unit 110 gradually identifies the feature and interprets the correlation as learning is advanced. When the correlation between the temperature rise value at the oblique rearward part of the cutting front of the workpiece and the adjustment of the laser cutting condition for the laser cutting is interpreted to a certain reliable extent, a learning result repeatedly output by the learning unit 110 is used to select the action (that is, decision making) of determining how the laser cutting condition for the laser cutting is adjusted with respect to a current state (that is, the temperature rise value at the oblique rearward part of the cutting front of the workpiece). That is, as the learning algorithm, is advanced, the learning unit 110 may gradually approximate the correlation between the temperature rise value at the oblique rearward part of the cutting front of the workpiece and the action of determining how the laser cutting condition is adjusted to an optimum solution.

A decision-making unit 122 adjusts a laser cutting condition within an adjustable range for each cutting condition on the basis of a learning result of the learning unit 110 (for example, a laser output or laser cutting speed has a lower limit value within a range in which laser cutting is allowed). The decision-making unit 122 outputs the adjusted laser cutting condition to the control unit 34. When a temperature rise value at the oblique rearward part of the cutting front of a workpiece is input to the machine learning device 100 at a stage at which learning by the learning unit 110 becomes available for adjusting the laser cutting condition, the decision-making unit 122 outputs the laser cutting condition (such as a focal position, a nozzle diameter, and cutting speed) in the laser cutting. The decision-making unit 122 determines the appropriate laser cutting condition for the laser cutting on the basis of the state variables S and the learning result of the learning unit 110.

As described above, in the machine learning device 100, the learning unit 110 learns the adjustment of a laser cutting condition with respect to a temperature rise value at the oblique rearward part of the cutting front of a workpiece according to a machine learning algorithm using the state variables S observed by the state observation unit 106 and the determination data D acquired by the determination data acquisition unit 108. The state variables S are composed of data such as the laser cutting condition data S1 and the oblique rearward part temperature rise data S2. The determination data D is uniquely calculated from information acquired when a workpiece is cut. Accordingly, by using a learning result of the learning unit 110, the machine learning device 100 according to the present embodiment makes it possible to automatically and accurately adjusts a laser cutting condition according to a temperature rise value at the oblique rearward part of the cutting front of a workpiece.

Further, the machine learning device 100 according to the present embodiment automatically adjusts a laser cutting condition for laser cutting when grasping a temperature rise value (oblique rearward part temperature rise data S2) at the oblique rearward part of the cutting front of a workpiece. Further, the machine learning device 100 promptly adjusts a value of a laser cutting condition for laser cutting to an appropriate value. That is, the machine learning device 100 according to the present embodiment may efficiently adjusts a laser cutting condition for laser cutting.

Next, a modified example of the machine learning device 100 of the cutting condition adjustment apparatus 1 will be described. The determination data acquisition unit 108 may use, as the determination data D, reflected light determination data D2 for determining the propriety of reflected light in laser cutting, besides the temperature rise value determination data D1. As the reflected light determination data D2, information indicating whether a detection value of reflected light in laser cutting is larger (appropriate) or smaller (inappropriate) than a predetermined threshold is, for example, used. That is, a result determined on the basis of an arbitrarily-set determination criterion is used as the reflected light determination data D2. The use of the reflected light determination data D2 as the determination data D makes it also possible to determine whether the cutting of a workpiece is accurately performed. In addition, the adjustment of a laser cutting condition is performed within a range in which a workpiece is properly cut.

Figure 5:
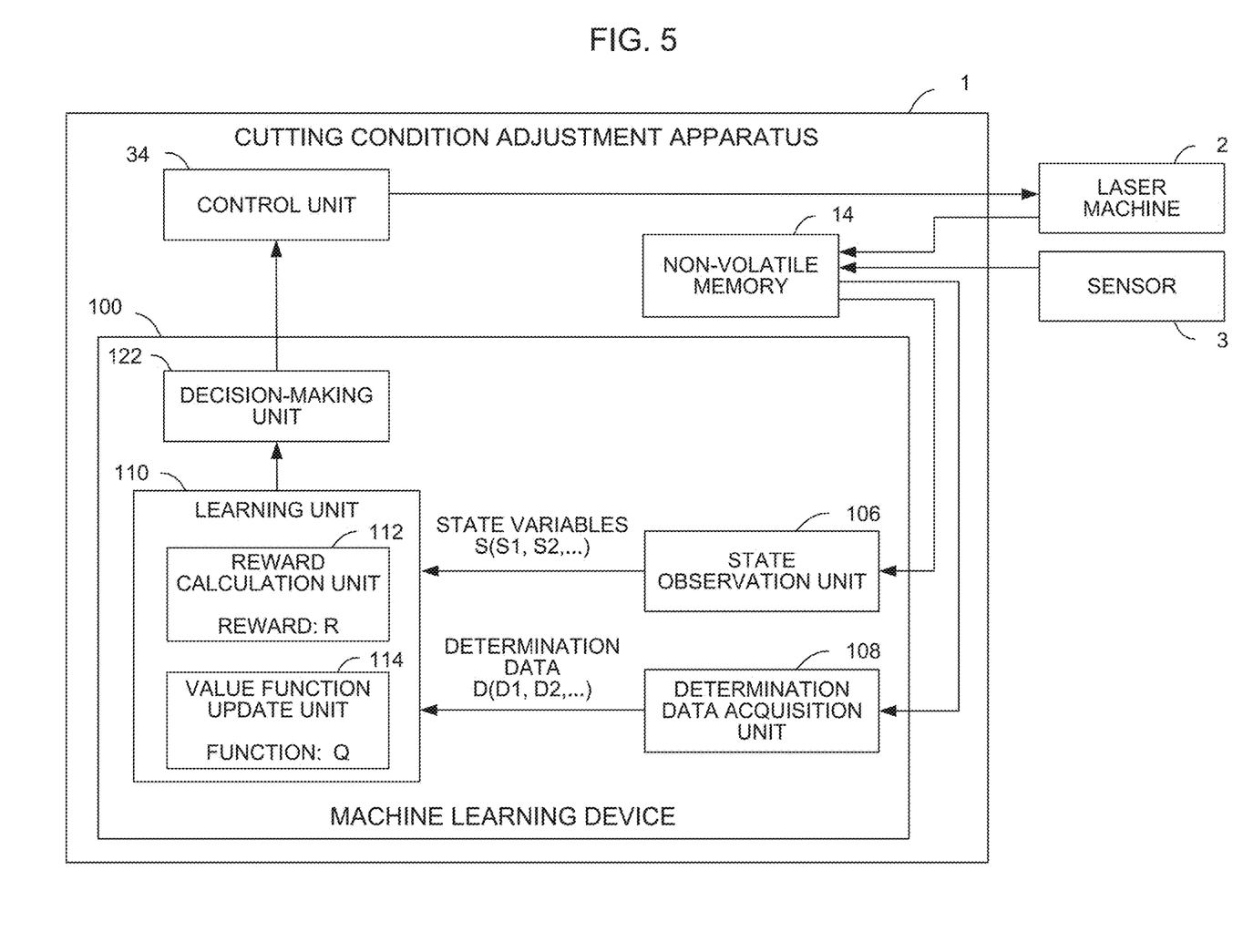
FIG. 5 is a schematic function block diagram showing an embodiment of the cutting condition adjustment apparatus.

In the machine learning device 100 having the above configuration, a learning algorithm performed by the learning unit 110 is not particularly limited. For example, a learning algorithm known as machine learning is employed. FIG. 5 shows an embodiment of the cutting condition adjustment apparatus 1 shown in FIG. 2. The cutting condition adjustment apparatus according to the present embodiment includes the learning unit 110 that performs reinforcement learning as an example of a learning algorithm. In the reinforcement learning, a predetermined action (that is, an output) is performed in a current state while the current state (that is, an input) of an environment in which a learning target exists is observed, and any reward is given to the action. In the reinforcement learning, these actions are regarded as one cycle, and the cycle is repeatedly performed. In the reinforcement learning, the correlation between an input and an output is learned such that the total of rewards is maximized, i.e., the output corresponding to the input becomes an optimum solution. The reinforcement learning in the machine learning device of the preset embodiment is a learning method for learning a laser cutting condition as an optimum solution.

As shown in FIG. 5, the learning unit 110 includes a reward calculation unit 112 and a value function update unit 114. The reward calculation unit 112 calculates a reward R associated with a propriety determination result (corresponding to the determination data D used in the next learning cycle of the learning cycle in which the state variables S have been acquired) of the cutting of a workpiece based on a laser cutting condition adjusted on the basis of the state variables S. The value function update unit 114 updates, using the calculated reward R, a function Q indicating a value of a laser cutting condition. The learning unit 110 learns the adjustment of a laser cutting condition with respect to a temperature rise value at the oblique rearward part of the cutting front of a workpiece in such a way that the value function update unit 114 repeatedly updates the function Q.

An example of a reinforcement learning algorithm performed by the learning unit 110 will be described. The algorithm in this example is known as Q-learning. In the Q-learning, the learning unit 110 learns, using a state s of an action subject and an action a capable of being taken by the action subject in the state s as independent variables, a function Q(s, a) indicating an action value when the action a is selected, in the state s. The selection of the action a by which the value of the value function Q becomes the largest in the state s results in an optimum solution. The learning unit 110 starts the Q-learning in a state in which the correlation between the state s and the action a has been unknown and repeatedly performs the selection of various actions a by trial and error in any state s. The learning unit 110 repeatedly updates the value function Q to be approximated to an optimum solution. When an environment (that, is, the state s) changes as the action a is selected in the state s, the learning unit. 110 is configured to obtain a reward (that is, weighting of the action a) r according to the change. When directed to select an action a by which a higher reward r is obtained, the learning unit 110 may approximate the value function Q to an optimum solution in a relatively short period of time.

Generally, the update formula of the value function Q may be expressed like the following Formula (1). In Formula (1), $s_t$ and $a_t$ express a state and an action at time t, respectively. The state changes from $s_t$ to $s_{t+1}$ with the action $a_t$. $r_{t+1}$ expresses a reward obtained when the state changes from $s_t$ to $s_{t+1}$. The term of maxQ expresses a value of Q in a case in which an action a by which the maximum value Q is obtained at time t+1 (which is assumed at time t) is performed, α and γ express a learning coefficient and a discount rate, respectively, and arbitrarily set to fall within $0 < \alpha \leq 1$ and $0 < \gamma \leq 1$, respectively.

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

When the learning unit 110 performs the Q-learning, the state variables S observed by the state observation unit 106 and the determination data D acquired by the determination data acquisition unit 108 correspond to the state s in the update formula. The action of determining how a laser cutting condition for laser cutting is adjusted with respect to a current state (that is, a temperature rise value at the oblique rearward part of the cutting front of a workpiece) corresponds to the action a in the update formula. The reward R calculated by the reward calculation unit 112 corresponds to the reward r in the update formula. The value function update unit 114 repeatedly updates the function Q indicating a value of a laser cutting condition with respect to a current state by the Q-learning using the reward R.

The reward R calculated by the reward calculation unit 112 is positive, for example, if a propriety determination result of the cutting of a workpiece performed after the adjustment of a laser cutting condition is determined to be "appropriate" (for example, a case in which a temperature rise value at the oblique rearward part of the cutting front of the workpiece is a predetermined threshold or less, a case in which the temperature rise value at the oblique rearward part of the cutting front of the workpiece is smaller than a temperature rise value in a previous learning cycle, or the like). The reward R calculated by the reward calculation unit 112 is negative, for example, if a propriety determination result of the cutting of a workpiece performed after the adjustment of a laser cutting condition is determined to be "inappropriate" (for example, a case in which a temperature rise value at the oblique rearward part of the cutting front of the workpiece is more than a predetermined threshold, a case in which the temperature rise value at the oblique rearward part of the cutting front of the workpiece is larger than a temperature rise value in a previous learning cycle, or the like). The absolute values of the positive and negative rewards R may be the same or different from each other. In addition, as determination conditions, a plurality of values included in the determination data D may be combined together to make a determination. In addition, a propriety determination result of the cutting of a workpiece may include not only two levels of results, that is, "appropriate" and "inappropriate" but also three or more levels of results.

In addition, when a plurality of determination data are used, a value of a reward is changed (weighted) for each of the determination data, whereby a target state in learning is changed. A threshold used to make a determination may be set to be relatively large at the initial stage of learning. In addition, a threshold used to make a determination as the learning is advanced may be set to be small.

The value function update unit 114 may have an action value table in which the state variables S, the determination data D, and the rewards R are associated with action values (for example, numeric values) expressed by the function Q. In this case, the action of updating the function Q with the value function update unit 114 is equivalent to the action of updating the action value table with the value function update unit 114. At the start of the Q-learning, the correlation between the current state of an environment and the adjustment of a laser cutting condition is unknown. Therefore, in the action value table, various kinds of the state variables S, the determination data D, and the rewards R are prepared in association with values (function Q) of randomly-set action values. Note that the reward calculation unit 112 may immediately calculate the rewards R corresponding to the determination data D when the determination data D is known. The calculated rewards R are written in the action value table.

When the Q-learning is advanced using the reward R corresponding to a propriety determination result of the operation of the laser machine 2, the learning is directed to select the action of obtaining a higher reward R. Then, values (function Q) of action values for an action performed in a current state are rewritten according to the state of an environment (that is, the state variables S and the determination data D) that changes as the selected action is performed in the current state. That is, the action value table is updated. When the update is repeatedly performed, values (the function Q) of action values displayed in the action value table are rewritten to be larger as an action (the action of adjusting a laser cutting condition for laser cutting such as increasing and decreasing a focal distance, increasing cutting speed, urging the replacement of a nozzle, and increasing and decreasing the pressure of assist gas during cutting within a range in which the laser cutting is allowed) is more appropriate. Thus, the correlation between a current state (a temperature rise value at the oblique rearward part of the cutting front of a workpiece) in an unknown environment and a corresponding action (adjustment of a laser cutting condition for laser cutting) becomes gradually obvious. That, is, by the update of the action value table, the correlation between a temperature rise value at the oblique rearward part of the cutting front of a workpiece and the action of adjusting a laser cutting condition is gradually approximated to an optimum solution.

Figure 6:
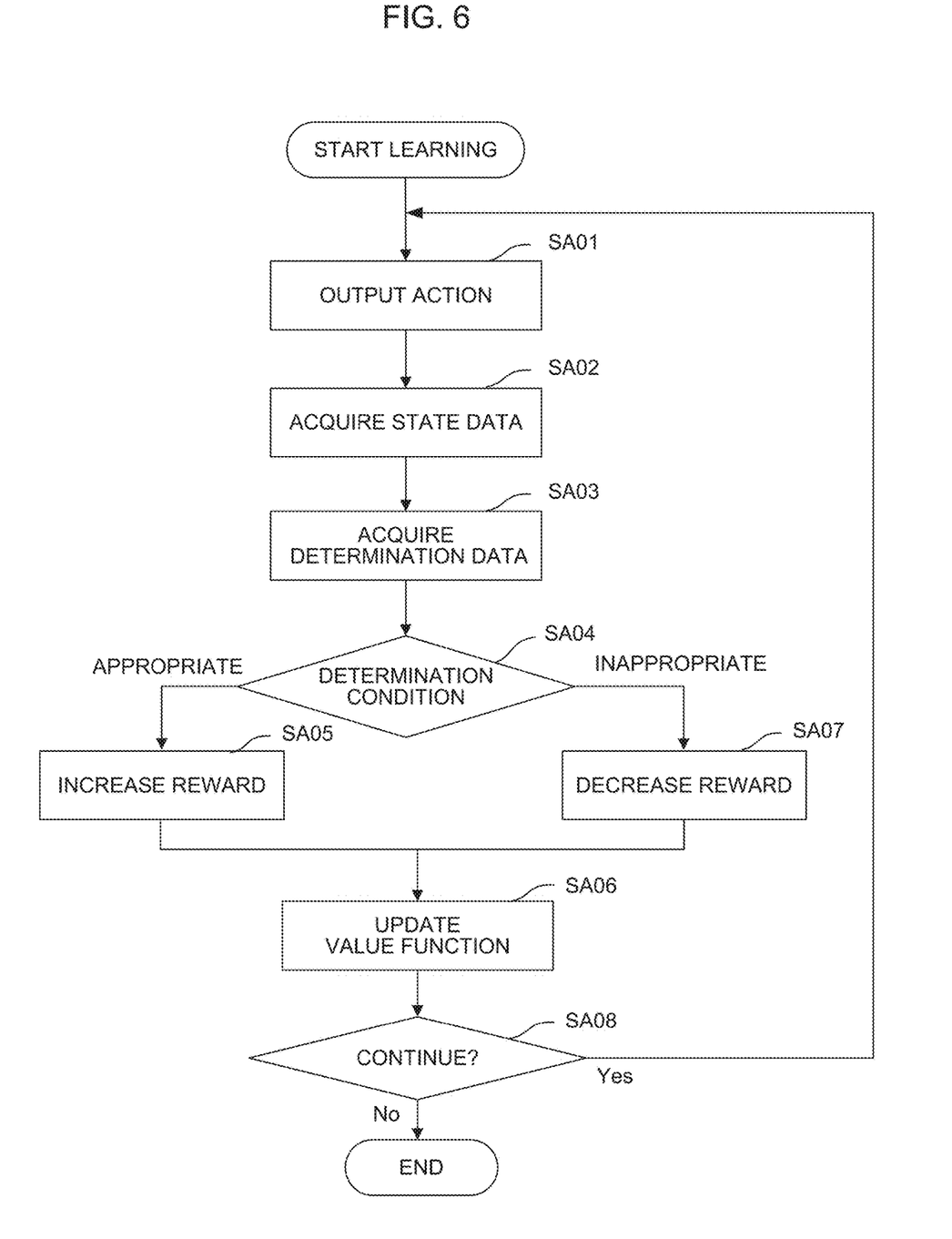
FIG. 6 is a schematic flowchart showing an embodiment of a machine learning method.

The flow of the above Q-learning (that is, an embodiment of a machine learning method) performed by the learning unit 110 will be further described with reference to FIG. 6. First, in step SA01, the value function update unit 114 randomly selects, by referring to an action value table at that time, the action of adjusting a laser cutting condition as an action performed in a current state indicated by the state variables S observed by the state observation unit 106. Next, in step SA02, the value function update unit 114 imports the state variable S in the current state observed by the state observation unit 106. In step SA03, the value function update unit 114 imports the determination data D in the current state acquired by the determination data acquisition unit 108. In step SA04, the value function update unit 114 determines if the cutting of a workpiece based on the adjusted laser cutting condition has been appropriately performed on the basis of the determination data D. If the cutting of the workpiece has been appropriately performed, the value function update unit 114 applies a positive reward R calculated by the reward calculation unit 112 to the update formula of the function Q in step SA05. Next, in step SA06, the value function update unit 114 updates the action value table using the state variable S and the determination data D in the current state, the reward R, and a value (updated function Q) of an action value. If it is determined in step SA04 that the cutting of the workpiece based on the adjusted laser cutting condition has been inappropriately performed, the value function update unit 114 applies a negative reward R calculated by the reward calculation unit 112 to the update formula of the function Q in step SA07. Then, in step SA06, the value function update unit 114 updates the action value table using the state variable S and the determination data D in the current state, the reward R, and the value (updated function Q) of the action value. The learning unit 110 updates the action value table over again by repeatedly performing the above processing of steps SA01 to SA07 and advances the learning of the adjustment of the laser cutting condition. Note that the processing of calculating the rewards R and the processing of updating the value function in steps SA04 to SA07 are performed for each of data contained in the determination data D.

Figure 7A:
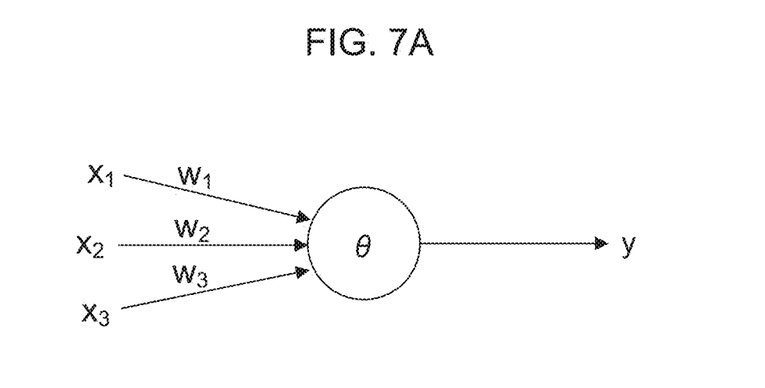
FIG. 7A is a diagram for describing a neuron.
Figure 7B:
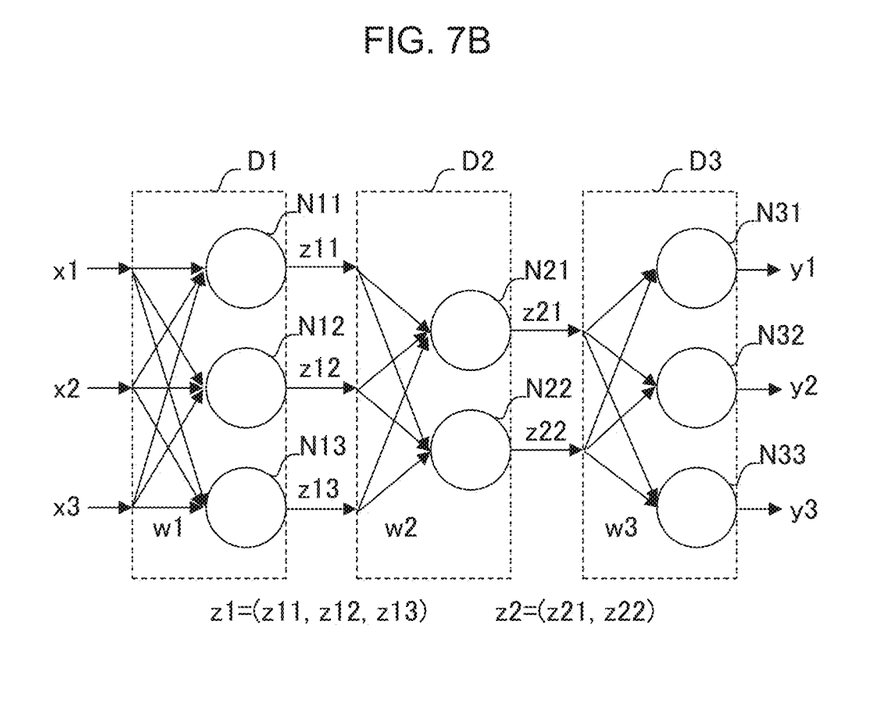
FIG. 7B is a diagram for describing a neural network.

In advancing the above reinforcement learning, a neural network may be, for example, applied. FIG. 7A schematically shows a neuron model. FIG. 7B schematically shows the model of a neural network having three layers in which the neurons shown in FIG. 7A are combined together. The neural network may be constituted by, for example, a calculation unit, a storage unit, or the like following a neuron model.

The neuron shown in FIG. 7A outputs a result y with respect to a plurality of inputs x (here, inputs $x_1$ to $x_3$ as an example). The inputs $x_1$ to $x_3$ are multiplied by weights w ($w_1$ to $w_3$), which correspond to the inputs x, respectively. Thus, the neuron outputs the result y expressed by the following Formula 2. Note that in the following Formula 2, an input x, a result y, and a weight w are all vectors. In addition, θ expresses a bias, and $f_k$ expresses an activation function.

$$y=f_k(\Sigma_{i=1}^{n} x_i w_i - \theta) \quad (2)$$

In the neural network having the three layers shown in FIG. 7B, a plurality of inputs x (here, inputs x1 to x3 as an example) are input from the left side of the neural network, and results y (here, results y1 to y3 as an example) are output from the right side of the neural network. In the example shown in FIG. 7B, the inputs x1, x2, and x3 are multiplied by corresponding weights (collectively expressed as w1) and input to three neurons N11, N12, and N13, respectively.

In FIG. 7B, the respective outputs of the neurons N11 to N13 are collectively expressed as z1. The outputs z1 may be regarded as feature vectors obtained by extracting feature amounts of the input vectors. In the example shown in FIG. 7B, the respective feature vectors z1 are multiplied, by corresponding weights (collectively expressed as w2) and input to two neurons N21 to N22, respectively. The feature vectors z1 express the features between the weights w1 and the weights w2.

In FIG. 7B, the respective outputs of neurons N21 and N22 are collectively expressed as z2. The outputs z2 may be regarded as feature vectors obtained by extracting feature amounts of the feature vectors z1. In the example shown in FIG. 7B, the respective feature vectors z2 are multiplied by corresponding weights (collectively expressed as w3) and input to three neurons N31, N32, and N33, respectively. The feature vectors z2 express the features between the weights w2 and the weight w3. Finally, the neurons N31, N32, and N33 output the results y1 to y3, respectively.

Note that it is possible to employ so-called deep learning in which a neural network forming three or more layers is used.

The machine learning device 100 may use a neural network as a value function in the Q-learning and use the state variables S and the action a as an input x. In this case, the learning unit 110 performs calculation in a multilayer structure according to the above neural network to output a value (result y) of the action in the state. Note that the action mode of the neural network includes a learning mode and a value prediction mode. For example, the machine learning device 100 can learn a weight w using a learning data set in the learning mode and determine an action value using the learned weight w in the value prediction mode. Note that detection, classification, deduction, or the like may be performed in the value prediction mode.

The configuration of the above cutting condition adjustment apparatus 1 may be described as a machine learning method (or software) performed by the processor 101. The machine learning method is a method for learning the adjustment of a laser cutting condition for laser cutting. In the machine learning method, the CPU of a computer performs: a step of observing laser cutting condition data S1 and oblique rearward part temperature rise data S2 as state variables S indicating the current state of an environment in which the laser machine 2 operates; a step of acquiring determination data D indicating a propriety determination result of the cutting of a workpiece based on an adjusted laser cutting condition for laser cutting; and a step of learning the oblique rearward part temperature rise data S2 and the adjustment of the laser cutting condition for the laser cutting in association with each other using the state variables S and the determination data D.

Figure 8:
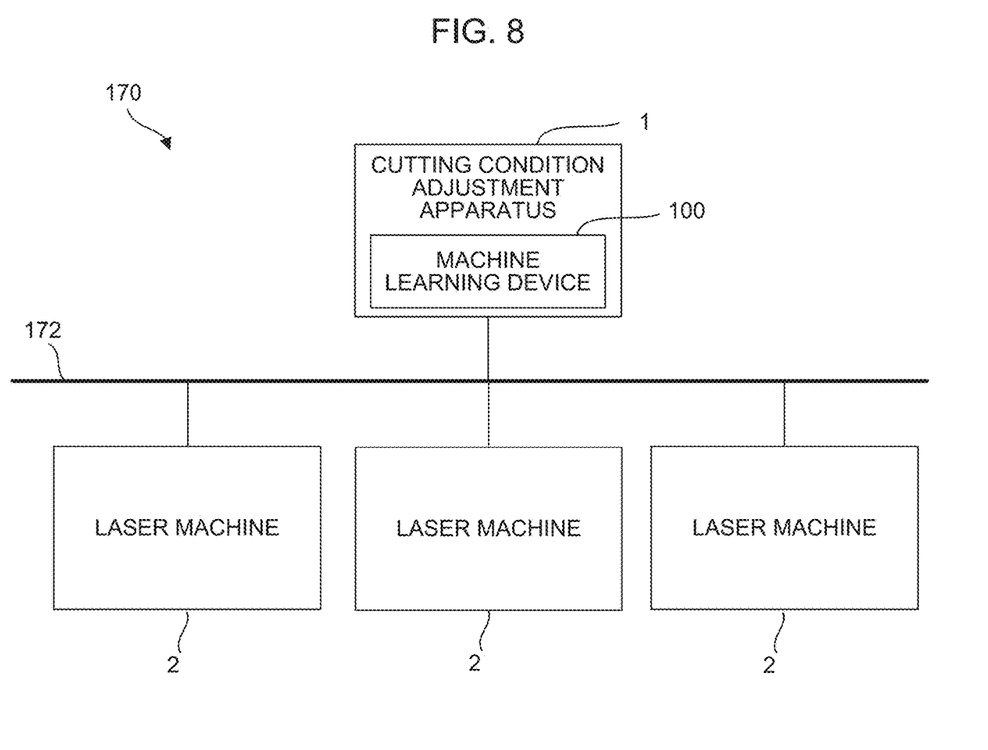
FIG. 8 is a schematic function block diagram showing an embodiment of a system in which a cutting condition adjustment apparatus is incorporated.

FIG. 8 shows a system 170 according to a third embodiment including a cutting condition adjustment apparatus 1. The system 170 includes at least one cutting condition adjustment apparatus 1 mounted as a part of a computer such as a cell computer, a host computer, and a cloud server, a plurality of laser machines 2 that are to be controlled, and a wired/wireless network 172 that connects the cutting condition adjustment apparatus 1 and laser machines 2 to each other.

In the system 170 having the above configuration, the cutting condition adjustment apparatus 1 including a machine learning device 100 may automatically and accurately adjust a laser cutting condition with respect to a temperature rise value at the oblique rearward part of the cutting front of a workpiece for each of the laser machines 2 using a learning result of the learning unit 110. In addition, the machine learning device 100 may learn the adjustment of a laser cutting condition on the basis of state variables S and determination data D obtained for each of the plurality of laser machines 2. When the machine learning device 100 has learned the adjustment of the laser cutting condition, a learning result may be shared in the operations of all the laser machines 2. Accordingly, the system 170 may improve learning speed or reliability in the machine learning device 100 using a variety of data sets (including state variables 8 and determination data D) as inputs.

The embodiments of the present invention are described above. However, the present invention is not limited to the examples of the above embodiments and may be carried out in various modes with the addition of appropriate modifications.

For example, a learning algorithm, and a calculation algorithm performed by the machine learning device 100 and a control algorithm performed by the cutting condition adjustment apparatus 1 are not limited to the above algorithms, but various algorithms may be employed.

In addition, the above embodiments describe a configuration in which the cutting condition adjustment apparatus 1 and the machine learning device 100 have a different CPU. However, the machine learning device 100 may be realized by the CPU 11 of the cutting condition adjustment apparatus 1 and a system program stored in the ROM 12.

The invention claimed is:

1. A machine learning device for learning laser cutting condition of a laser machine configured to perform laser cutting on a workpiece, the machine learning device comprising:
    a state observation unit configured to observe, as state variables indicating a current state of an environment, cutting condition data indicating the laser cutting condition for the laser cutting and oblique rearward temperature rise data indicating a temperature rise value at an oblique rearward part of a cutting front of the workpiece,
    a determination data acquisition unit configured to acquire temperature rise value determination data for determining propriety of the temperature rise value at the oblique rearward part of the cutting front of the workpiece during cutting based on the laser cutting condition for the laser cutting as determination data indicating a propriety determination result of the cutting of the workpiece, and
    a learning unit configured to perform machine learning to learn the temperature rise value at the oblique rearward part of the cutting front of the workpiece and adjustment of the laser cutting condition for the laser cutting in association with each other using the state variables and the determination data, wherein the machine learning device outputs a command for controlling an operation of the laser machine based on a result of the machine learning, and the oblique rearward temperature rise data includes data obtained by observing a difference between a first temperature of the workpiece measured by a sensor at the oblique rearward part of the cutting front of the workpiece during the cutting and a second temperature of the workpiece before being subjected to the cutting as measured by another sensor at a position distant from the oblique rearward part of the cutting front of the workpiece.

2. The machine learning device according to claim 1, wherein the oblique rearward temperature rise data includes further data obtained by observing a further difference between the first temperature and an estimated temperature of the workpiece before being subjected to the cutting.

3. The machine learning device according to claim 1, wherein the determination data acquisition unit is configured to further acquire reflected light determination data for determining propriety of reflected light during the cutting based on the laser cutting condition for the laser cutting as the determination data indicating the propriety determination result of the cutting of the workpiece.

4. The machine learning device according to claim 1, wherein the learning unit includes a reward calculation unit configured to calculate a reward associated with the propriety determination result, and a value function update unit configured to, using the reward, update a function indicating a value of an action of adjusting the laser cutting condition for the laser cutting with respect to the temperature rise value at the oblique rearward part of the cutting front of the workpiece, and the reward calculation unit is configured to provide a higher reward as the temperature rise value at the oblique rearward part of the cutting front of the workpiece is smaller.

5. The machine learning device according to claim 1, wherein the learning unit is configured to perform calculation of the state variables and the determination data in a multilayer structure.

6. A cutting condition adjustment apparatus comprising:
the machine learning device according to claim 1, wherein
the cutting condition adjustment apparatus is configured to adjust the laser cutting condition.

7. A cutting condition adjustment apparatus comprising:
the machine learning device according to claim 1, wherein
the machine learning device exists in a cloud server.

8. The machine learning device according to claim 1, wherein
the oblique rearward part is oblique with respect to a cutting direction of the laser cutting when seen from the cutting front of the workpiece.

9. The machine learning device according to claim 1, wherein
the oblique rearward part of the cutting front of the workpiece corresponds to a position adjacent to a part of the workpiece at which the laser cutting has been completed.

10. A machine learning device that has learned a laser cutting condition of a laser machine configured to perform laser cutting on a workpiece, the machine learning device comprising:

a state observation unit configured to observe, as state variables indicating a current state of an environment, cutting condition data indicating the laser cutting condition for the laser cutting and oblique rearward temperature rise data indicating a temperature rise value at an oblique rearward part of a cutting front of the workpiece;

a learning unit that has learned the temperature rise value at the oblique rearward part of the cutting front of the workpiece and adjustment of the laser cutting condition for the laser cutting in association with each other; and a decision-making unit configured to make a decision to perform the adjustment of the laser cutting condition for the laser cutting on the basis of the state variables observed by the state observation unit and a learning result of the learning unit, wherein the oblique rearward temperature rise data includes data obtained by observing a difference between a first temperature of the workpiece measured by a sensor at the oblique rearward part of the cutting front of the workpiece during the cutting and a second temperature of the workpiece before being subjected to the cutting as measured by another sensor at a position distant from the oblique rearward part of the cutting front of the workpiece.

11. A cutting condition adjustment apparatus comprising:
the machine learning device according to claim 10, wherein
the cutting condition adjustment apparatus is configured to adjust the laser cutting condition.

12. A cutting condition adjustment apparatus comprising:
the machine learning device according to claim 10, wherein
the machine learning device exists in a cloud server.

13. The machine learning device according to claim 10, wherein
the oblique rearward part is oblique with respect to a cutting direction when seen from the cutting front of the workpiece.

14. The machine learning device according to claim 10, wherein
the oblique rearward part of the cutting front of the workpiece corresponds to a position adjacent to a part of the workpiece at which the cutting has been completed.

* * * * *